(12) United States Patent
Marchlewski et al.

(10) Patent No.: US 10,525,863 B2
(45) Date of Patent: Jan. 7, 2020

(54) PICK-UP TRUCK WINCH APPARATUS

(71) Applicant: FORD GLOBAL TECHNOLOGIES, LLC, Dearborn, MI (US)

(72) Inventors: Jack Marchlewski, Saline, MI (US); Vincent Anthony Chimento, Plymouth, MI (US); Dragan B. Stojkovic, Taylor, MI (US); Joshua Robert Hemphill, White Lake, MI (US); Robert Reiners, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 139 days.

(21) Appl. No.: 15/660,369

(22) Filed: Jul. 26, 2017

(65) Prior Publication Data
US 2019/0031072 A1    Jan. 31, 2019

(51) Int. Cl.
*B60P 1/00* (2006.01)
*B60P 3/07* (2006.01)

(52) U.S. Cl.
CPC .. *B60P 1/00* (2013.01); *B60P 3/07* (2013.01)

(58) Field of Classification Search
CPC ......... B60P 1/00; B60P 1/5423; B60P 1/5471; B60P 3/07; B60P 3/122; B66D 2700/0183
USPC .......................... 414/538, 559; 254/323, 324
See application file for complete search history.

(56) References Cited

U.S. PATENT DOCUMENTS

| | | | | |
|---|---|---|---|---|
| 298,405 A * | 5/1884 | Reitz | ......... | B60P 3/41 254/324 |
| 329,389 A * | 10/1885 | Hosner | ......... | B60P 3/41 254/324 |
| 724,579 A * | 4/1903 | Hysore | ......... | B60P 3/41 254/324 |
| 765,683 A * | 7/1904 | Schuman | ......... | B60P 1/48 212/74 |
| 3,341,038 A * | 9/1967 | Wicklund | ......... | B60P 1/5423 212/262 |
| 3,912,093 A * | 10/1975 | Kruschke | ......... | B60P 1/5428 212/245 |
| 4,212,580 A * | 7/1980 | Fluck | ......... | B60P 3/1058 298/1 A |
| 4,348,151 A | 9/1982 | Olson | | |
| 4,458,881 A * | 7/1984 | Jones | ......... | B66D 1/04 242/395 |
| 5,509,639 A * | 4/1996 | Ellis | ......... | B60P 3/12 224/517 |
| 5,511,929 A * | 4/1996 | Loftus | ......... | B60P 1/5423 212/180 |

(Continued)

Primary Examiner — James Keenan
(74) Attorney, Agent, or Firm — Vichit Chea; Brooks Kushman P.C.

(57) ABSTRACT

A winch is mounted in a pick-up truck bed having a floor, sidewalls, and a front wall. The sidewalls each include at least one receptacle that are each adapted to receive a connector. A frame includes a beam that is held spaced from the floor and extends in a transverse direction across the truck bed. The beam may be arcuate or straight and is connected to right and left connectors on right and left ends of the beam. The connectors may be connected directly to the receptacles or may be connected through right and left rails to the receptacles. The winch is attached to a winch mounting plate provided on the beam and is used to facilitate loading and unloading objects.

9 Claims, 5 Drawing Sheets

(56) References Cited

U.S. PATENT DOCUMENTS

| | | | | |
|---|---|---|---|---|
| 6,176,674 B1* | 1/2001 | Meeks | ............... | B60P 3/07 |
| | | | | 414/462 |
| 7,568,876 B1* | 8/2009 | Tenney | ............... | B66D 3/006 |
| | | | | 414/538 |
| 7,997,827 B2* | 8/2011 | Fogg | ............... | B63C 3/06 |
| | | | | 254/324 |
| 8,366,373 B2* | 2/2013 | Wood | ............... | B60P 3/12 |
| | | | | 212/175 |
| 8,534,978 B2 | 9/2013 | Dieziger | | |
| 10,071,667 B2* | 9/2018 | Kleinatland | ............... | B66D 1/12 |
| 2011/0123304 A1* | 5/2011 | Thomas | ............... | B60P 3/122 |
| | | | | 414/538 |
| 2012/0160987 A1 | 6/2012 | Brown | | |
| 2013/0181023 A1 | 7/2013 | Shawanda | | |
| 2013/0223972 A1* | 8/2013 | Eng | ............... | B60P 1/43 |
| | | | | 414/812 |
| 2017/0274809 A1* | 9/2017 | Robinson | ............... | B60P 1/00 |
| 2018/0022174 A1* | 1/2018 | Stojkovic | ............... | B66D 1/28 |
| | | | | 414/506 |

* cited by examiner

PICK-UP TRUCK WINCH APPARATUS

TECHNICAL FIELD

This disclosure relates to a pick-up truck having a winch assembled to receptacles provided on the sidewalls of the bed.

BACKGROUND

Pick-up trucks are popular, in part, because they may be used to transport a wide variety of objects. For example, pick-up trucks may be used to transport relatively heavy wheeled vehicles such as motorcycles, All Terrain Vehicles (ATVs), snow mobiles, personal watercraft, and lawn tractors. Ramps may be used to facilitate loading and unloading wheeled vehicles into the bed of the pick-up truck, but even with the use of ramps heavy objects may be difficult to load into the truck bed that may be more than three feet above the ground.

Winches may be used to facilitate loading vehicles into the truck bed. Bed winch mount assemblies are known for attaching a winch and winch motor or drive to pick-up truck beds. However, the assemblies are designed to be attached to the bed, stake pockets on the top edge of the sidewalls, the end wall of the bed, or the cab of the pick-up truck. Permanent connectors or adapters are required to be attached to the pick-up truck to receive the bed winch mount assemblies that necessitate drilling holes in the truck bed and may compromise the anti-corrosion coatings and paint.

Aluminum pick-up trucks have been developed to reduce vehicle weight and provide improved fuel efficiency, increased cargo capacity and better handling. Fasteners such as common steel screws and bolts are difficult to adequately secure to the body panels forming the pick-up truck bed and are not recommended to be used with an aluminum pick-up truck box. In addition, galvanic corrosion may develop between the aluminum body parts and steel fasteners that can adversely affect the paint or durability of the pick-up truck bed.

This disclosure is directed to solving the above problems and other problems as summarized below.

SUMMARY

According to one aspect of this disclosure, a pick-up truck body including a truck bed having a floor and sidewalls is provided with a winch. The sidewalls each include a receptacle. A frame includes a beam extending in a transverse direction across the truck bed. The beam is held spaced from the floor. Right and left connectors are provided on right and left ends of the beam that are adapted to be received in the receptacles. The winch is attached to the beam and may be used to facilitate loading and unloading objects.

According to another aspect of this disclosure, a pick-up truck including a truck body having a truck bed having a floor, and right and left sidewalls that each include a front receptacle and a rear receptacle. A winch support frame includes a beam extending transversely across the truck bed that has a winch mounting plate provided on the beam, and right and left rails. Each rail includes a front connector and a rear connector that are adapted to be received in the front and rear receptacles, respectively.

According to another aspect of this disclosure, a winch assembly is provided for a truck bed having a floor, and right and left sidewalls that are each provided with a receptacle. A beam extends in a transverse direction across the truck bed spaced from the floor with a winch attached to the beam. Right and left connectors disposed on right and left ends of the beam are adapted to be attached to the receptacles in the right and left sidewalls.

According to other aspects of this disclosure, the beam may be arcuate with a concave side facing a tailgate receiving portion of the truck bed. A plate may be provided on the beam at a lateral center of the beam that is adapted to receive the winch. An electric motor may be operatively connected to the winch to extend and retract a cable from the winch that is attached to an object to be loaded and unloaded from the truck bed.

Alternatively, the right and left rails may be attached to right and left ends of the beam. Each rail may extend parallel to one of the right and left sidewalls and may have front and rear sets of connectors received in front and rear sets of receptacles provided on right and left sidewalls.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
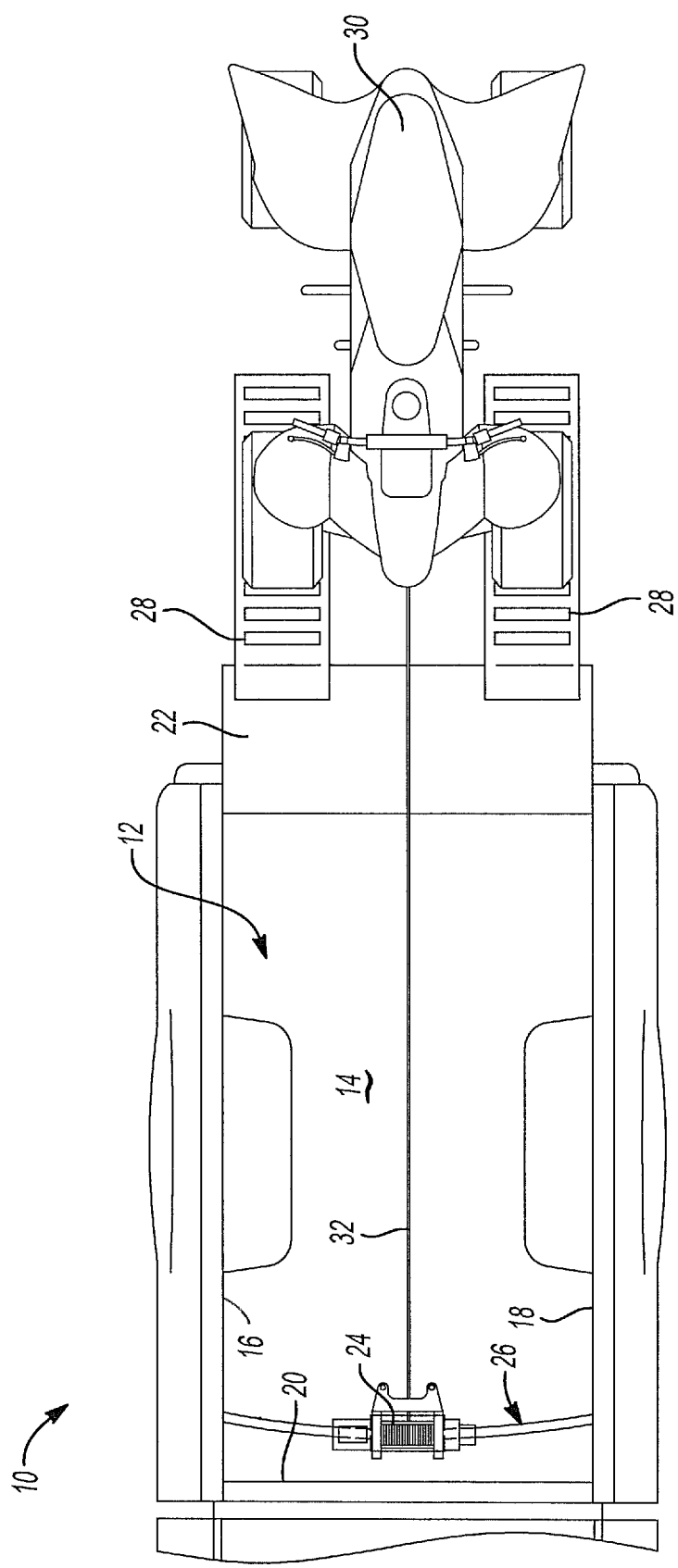
FIG. 1 is a fragmentary top plan view of a pick-up truck including a winch shown loading an all-terrain vehicle into the bed of the truck.

Referring to FIG. 1, a pick-up truck is generally indicated by reference numeral 10. The pick-up truck 10 features a truck bed 12 that is formed by a floor 14, a right sidewall 16 and a left sidewall 18, a front wall 20 and a tailgate 22. A winch 24 is shown disposed above a front portion of the truck bed 12 on a winch mounting frame. A pair of ramps 28 are attached to the tailgate 22 that extend between the floor 14 or tailgate 22 in an open position and the ground. An object 30 such as the all-terrain vehicle (ATV) illustrated in FIG. 1 is shown being pulled into the truck bed 12 by a cable 32 that is extended and retracted from the winch 24

Figure 2:
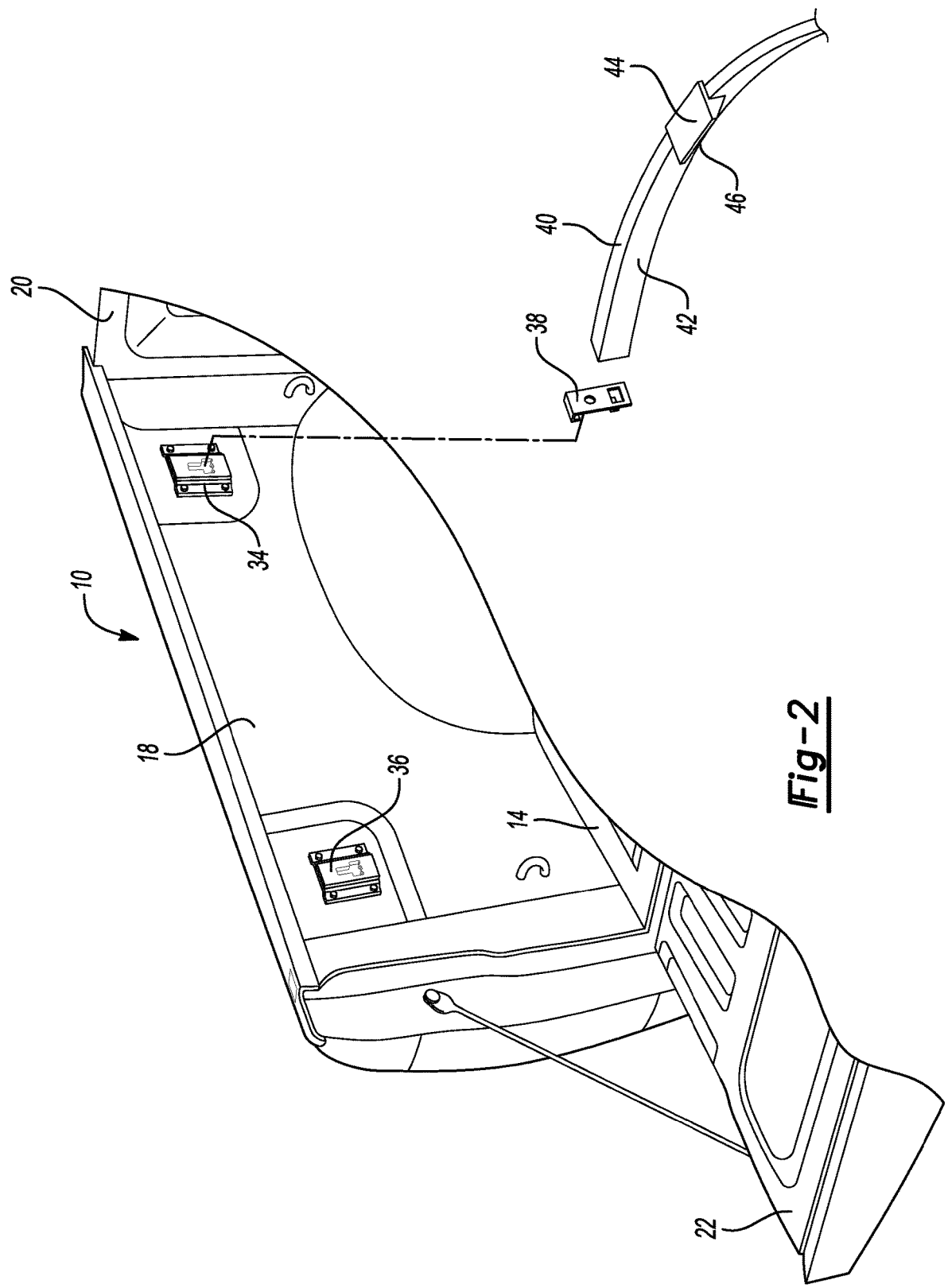
FIG. 2 is a fragmentary perspective view of a sidewall of the pick-up truck illustrating a winch mounting apparatus including a beam and connector exploded away from the sidewall

Referring to FIG. 2, the winch mounting frame 26 is attached to a front receptacle 34 and a rear receptacle 36 that are shown on a left sidewall 18 of the pick-up truck 10. The rear receptacle 36 is near the tailgate 22 and spaced above the floor 14. The front receptacle 34 is near the front wall 20 and is also spaced from the floor 14 to the same extent as the rear receptacle 36.

A connector 38 is shown in FIG. 2 detached from an arcuate beam 40 but is permanently attached to an end of the arcuate beam 40 and is adapted to be detachably secured to the front receptacle 34. The arcuate beam 40 has a concave side 42 that faces the tailgate 22. A winch mounting plate 44 is attached to a lateral center 46 of the beam 40.

Figure 3:
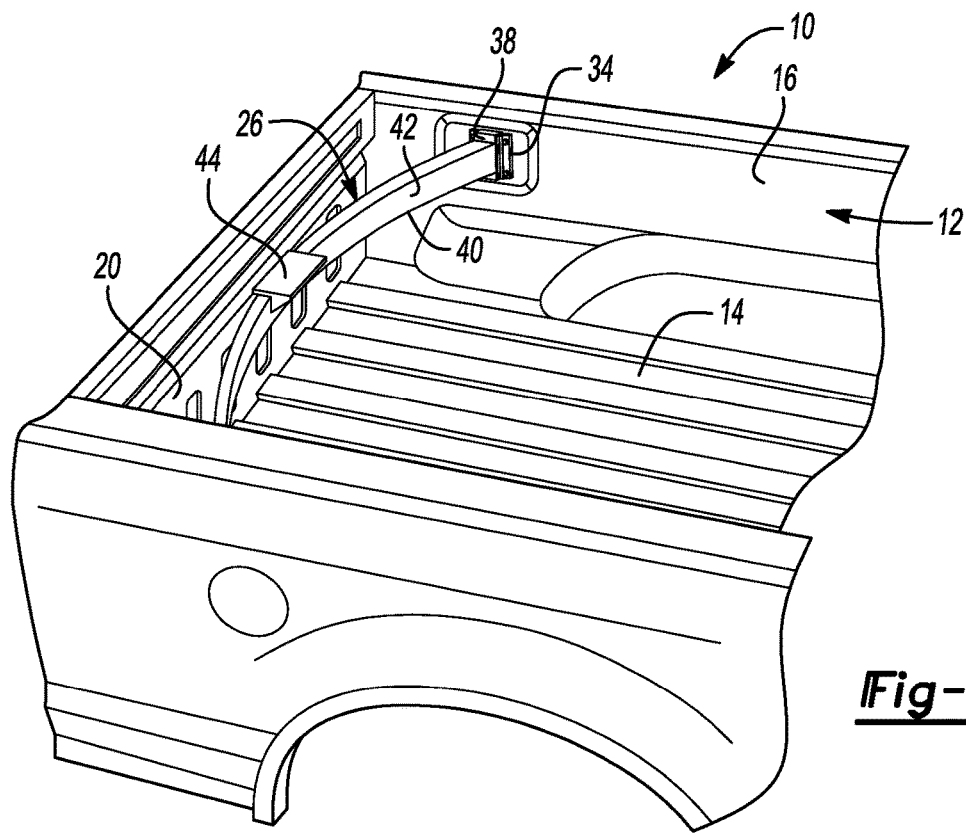
FIG. 3 is a fragmentary side perspective view of a front portion of the pick-up truck with the winch mounting apparatus shown in FIG. 2 including the beam and connector attached to the sidewalls.
Figure 4:
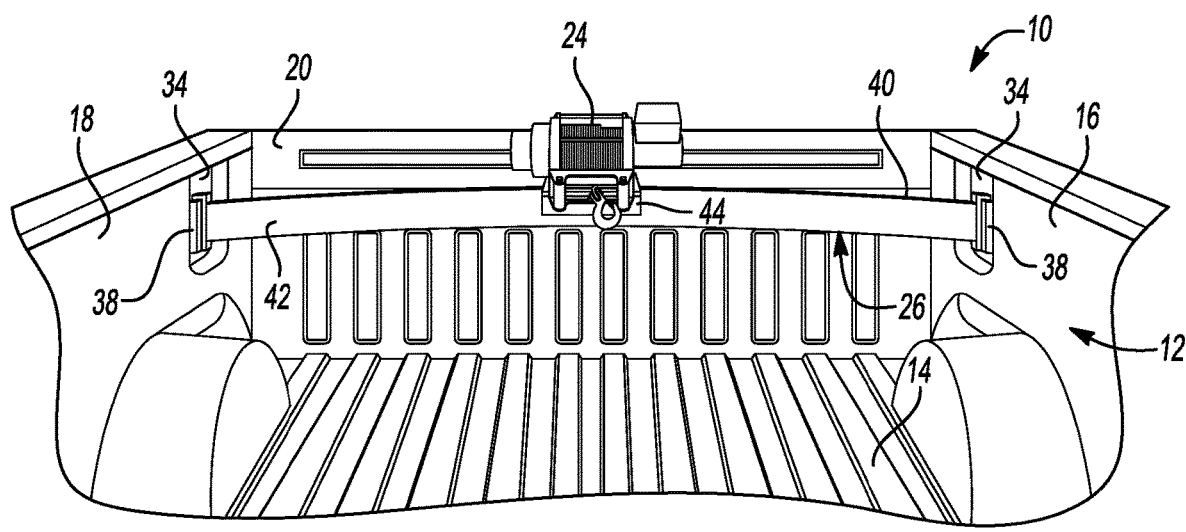
FIG. 4 is a fragmentary rear perspective view of a front portion of the pick-up truck illustrating an alternative winch mounting apparatus including the beam, connector, and a winch attached to the sidewalls.

Referring to FIGS. 3 and 4, the winch mounting frame 26 is shown assembled to the right and left sidewalls 16 and 18 with the connectors attached to the front receptacles 34. The beam 40 is arcuate and has a concave side 42 facing the tailgate (shown in FIG. 1). The arcuate shape of the beam 40 transfers the force applied when the winch 24 shown in FIG. 4 pulls an object (shown in FIG. 1) up into the truck bed 12 to the receptacles 34. The winch 24 shown in FIG. 4 is attached to the winch mounting plate 40 shown in FIG. 3.

Figure 5:
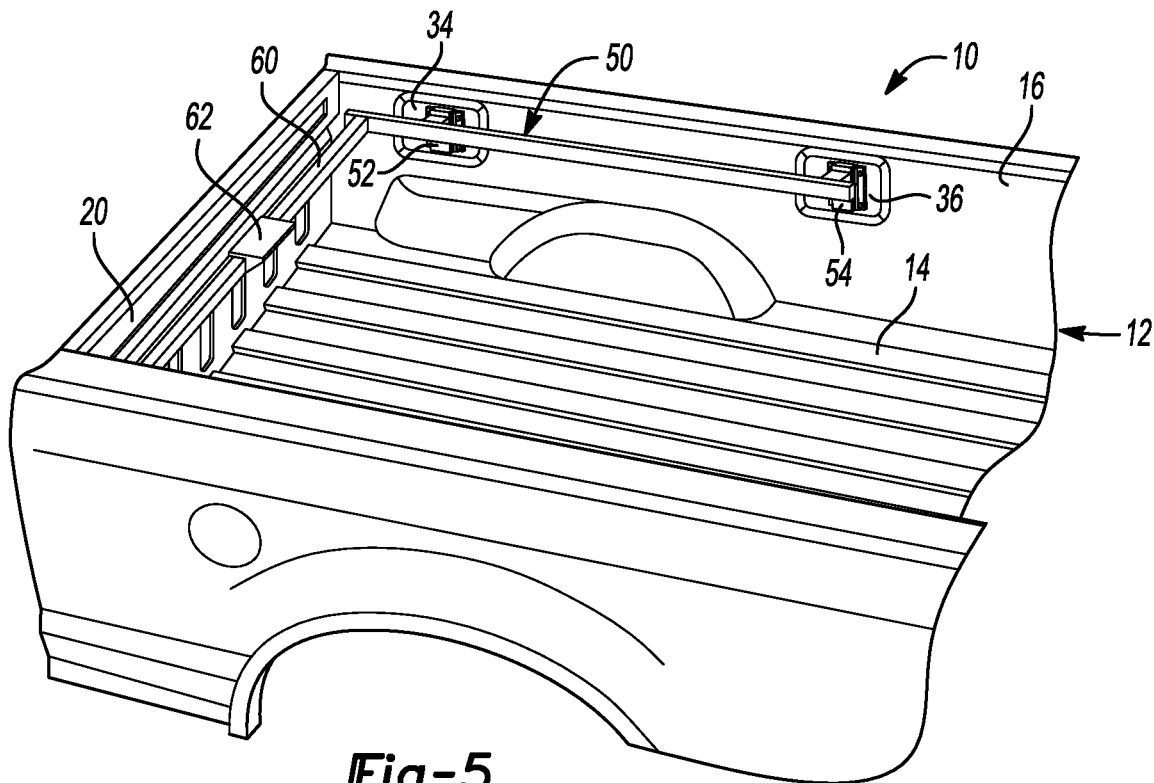
FIG. 5 is a fragmentary side perspective view of a front portion of the pick-up truck with the winch mounting apparatus shown in FIG. 4 including a frame including a beam, a left rail and front and rear connectors attached to the sidewalls.
Figure 6:
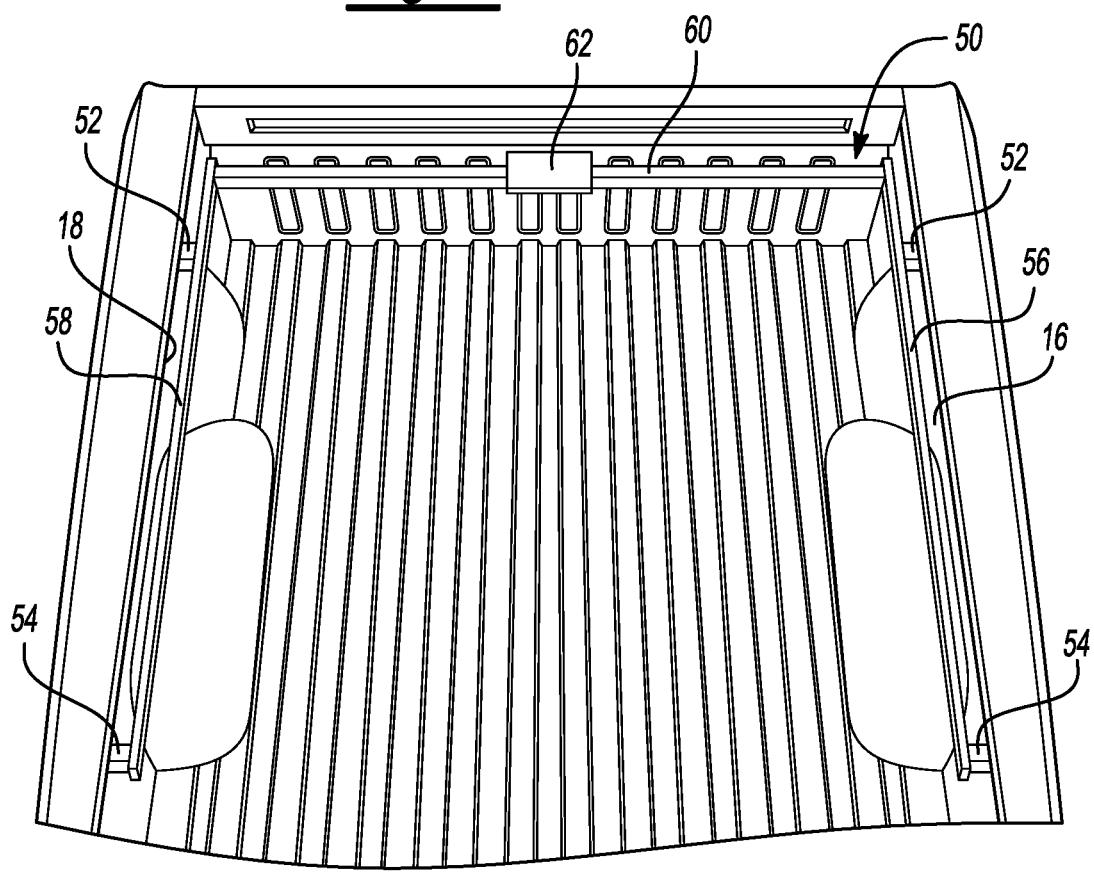
FIG. 6 is a fragmentary rear perspective view of a front portion of the pick-up truck with an alternative winch mounting apparatus including a beam, right and left rails, front and rear connectors, and a mounting plate for a winch attached to the sidewalls.

Referring to FIGS. 5 and 6, an alternative embodiment of a winch mounting frame is generally identified by reference numeral 50. Elements corresponding to elements of the embodiment of FIGS. 2-4 are referred to by the same reference numerals in this embodiment. The frame 50 is attached to the front receptacles 34 by a front connector 52 and to the rear receptacles 36 by rear connectors 54. The front and rear connectors 52 and 54 are attached to a right rail 56 and a left rail 58. The right and left rails 56 and 58 extend parallel to the right and left sidewalls 16 and 18.

A straight beam 60 extends in the transverse vehicle direction at is connected on opposite ends to the right and left rails 56 and 58. The straight beam 60 is disposed in the front portion of the truck bed 12 near the front wall 20. A winch mounting plate 62 is provided at the lateral center of the beam 60 and is adapted to receive a winch 24 (as shown in FIGS. 1 and 4). When an object 30 (shown in FIG. 1) is raised or lowered by the winch 24 the forces applied to the winch are transferred through the straight beam 60 to the right and left side rails 56, 58. The side rails 56, 58 in turn transfer the load to the front and rear receptacles 34, 36 through the front and rear connectors 52, 54.

Figure 7:
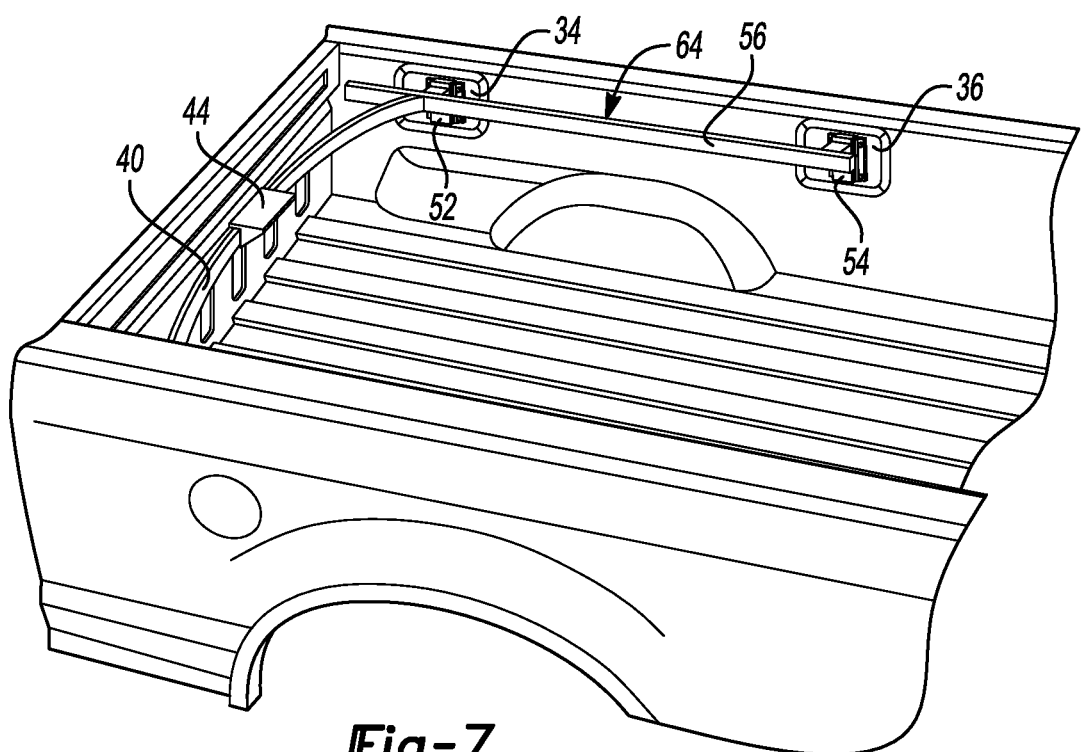
FIG. 7 is a fragmentary side perspective view of a front portion of the pick-up truck with an alternative winch mounting apparatus including a frame including a beam, a left rail and front and rear connectors attached to the sidewalls.
Figure 8:
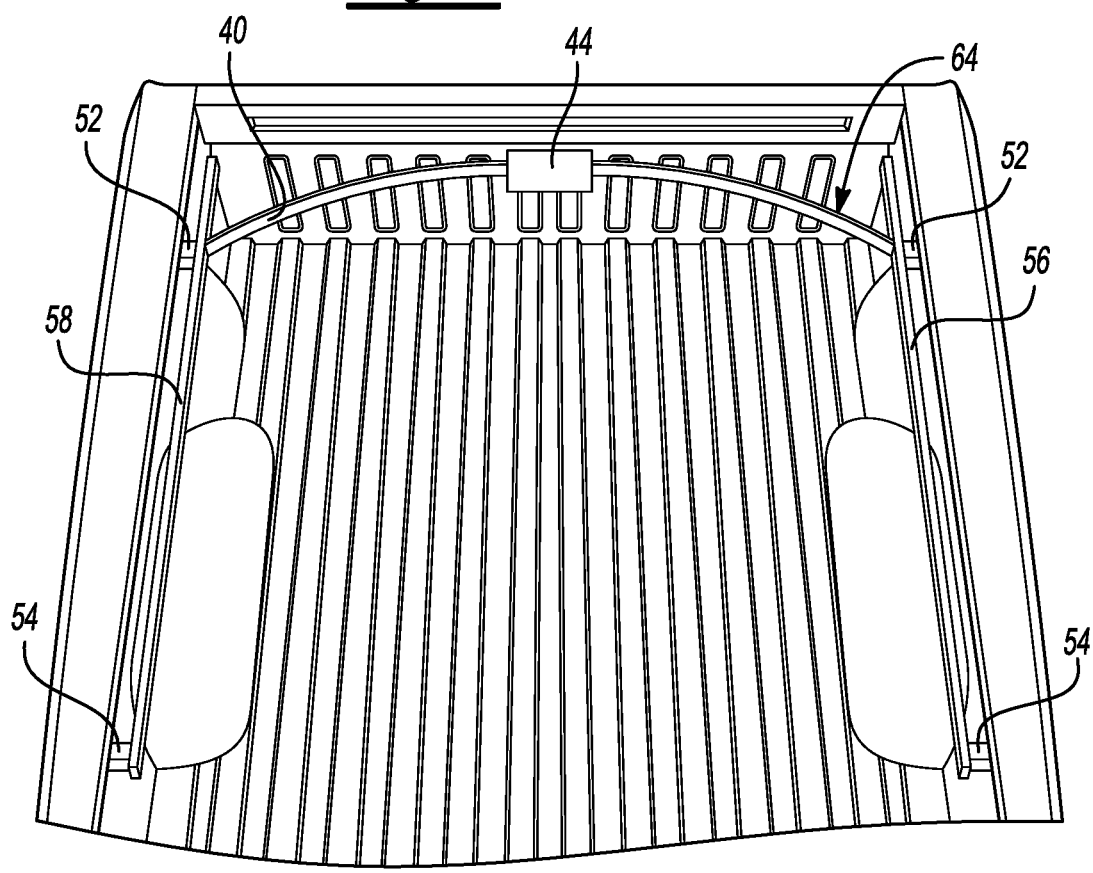
FIG. 8 is a fragmentary rear perspective view of a front portion of the pick-up truck with the beam, right and left rails, front and rear connectors, and a mounting plate for a winch attached to the sidewalls.

Referring to FIGS. 7 and 8, another alternative embodiment of a winch mounting frame is generally identified by reference numeral 64. Elements corresponding to elements of the embodiment of FIGS. 2-6 are referred to by the same reference numerals in this embodiment. The frame 64 includes an arcuate beam 40 that is secured to the right and left rails 56 and 58 by the front and rear connectors 52 and 54. The frame 64 generally combines functionality of the arcuate beam 40 with the rails 56 and 58 that are connected to both the front and rear receptacles 34 and 36 by the front and rear connectors 52 and 54. The arcuate shape of the beam 40 inhibits rearward deflection as the winch is used to move an object 30 into and out of the truck bed 12. The right and left side rails 56 and 58 resist rotation of the beam 40 that may be caused by operation of the winch 24 (shown in FIGS. 1 and 4). The winch is attached to a winch mounting plate 62 as previously described with reference to FIGS. 1-4.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pick-up truck comprising:
   a truck body including a truck bed having a floor and right and left sidewalls, wherein the right and left sidewalls each include a front and a rear receptacle, thereby defining front and rear pairs of receptacles;
   a frame disposed entirely below a top edge of the sidewalls including—
      an arcuate beam extending in a transverse direction across the truck bed and spaced from the floor, the beam having a concave side facing a tailgate receiving portion of the truck bed,
      right and left rails attached to right and left ends of the beam and extending parallel to the right and left sidewalls,
      right and left front connectors received by the front pair of receptacles,
      right and left rear connectors received in the rear pair of receptacles rearward of the front pair of receptacles; and
   a winch attached to the beam.

2. The pick-up truck of claim 1 further comprising:
   a plate provided on the beam at a lateral center of the beam that is adapted to receive the winch.

3. The pick-up truck of claim 1 further comprising:
   an electric motor operatively connected to the winch to extend and retract a cable from the winch that is attached to an object loaded and unloaded from the truck bed.

4. A pick-up truck comprising:
   a truck body including a truck bed having a floor, and sidewalls that each include a front receptacle and a rear receptacle disposed below an upper edge of the sidewall;
   a winch support frame disposed completely below the upper edge of the sidewall including a beam having a concave side facing a tailgate receiving portion of the truck bed and extending transversely across the truck bed, right and left rails attached to respective right and left ends of the beam, wherein each rail includes a front connector and a rear connector that are adapted to be received in the front receptacle and rear receptacle, respectively; and
   a winch mounting plate provided on the beam.

5. The pick-up truck of claim 4 further comprising:
   an electric winch attached to the winch mounting plate.

6. The pick-up truck of claim 4 further comprising:
   an electric motor operatively connected to the winch mounting plate; and a winch operatively connected to the winch mounting plate adapted to extend and retract a cable from the winch that is attached to an object loaded and unloaded from the truck bed.

7. A winch assembly for a truck bed having a floor, and right and left sidewalls that are each provided with a receptacle, comprising:

a beam extending in a transverse direction across the truck bed at an intermediate location on the sidewalls between the floor and an upper end of the sidewalls, wherein the beam is arcuate and has a concave side facing a tailgate receiving portion of the truck bed, and wherein right and left ends of the beam are affixed to the receptacles below an upper end of the sidewalls and above the floor, right and left connectors disposed on right and left ends of the beam that are adapted to be attached to the receptacles at the intermediate location in the right and left sidewalls; and a winch attached to the beam.

8. The winch assembly of claim 7 further comprising:

a plate provided on the beam at a lateral center of the beam that is adapted to receive the winch.

9. The winch assembly of claim 7 further comprising:

an electric motor operatively connected to the winch to extend and retract a cable from the winch that is attached to an object loaded and unloaded from the truck bed.

* * * * *